United States Patent Office 3,362,973
Patented Jan. 9, 1968

3,362,973
METHOD FOR PRODUCING HALPHEN-NEGATIVE COTTONSEED OIL
Frank C. Magne, August V. Bailey, Evald L. Skau, and Robert A. Pittman, New Orleans, La., assignors to the United States of America as represented by the Secretary of Agriculture
No Drawing. Filed Dec. 20, 1966, Ser. No. 603,395
2 Claims. (Cl. 260—424)

ABSTRACT OF THE DISCLOSURE

A new low-temperature process removes the cyclopropenoid moiety of cottonseed oils. Either crude or refined oil is treated with selected metallic-salt inactivators which destroy the cyclopropenoid moiety. The inactivator may be removed by washing with an aqueous solution of a dilute acid, and drawing off the wash water, then washing to remove the acid. Another method of removing the metallic-salt inactivator is to precipitate the metallic salt as a hydroxide by washing with water and separating the precipitated metallic hydroxide by filtration.
The end products are useful in the diet of laying hens.

---

A non-exclusive, irrevocable, royalty-free license in the invention herein described throughout the world for all purposes of the United States Government, with the power to grant sublicenses for such purposes is hereby granted to the Government of the United States of America.

Disclosure of invention

This invention relates to a low-temperature method for producing Halphen-negative cottonseed oil, particularly suitable for laying hen rations. More specifically it deals with a low-temperature method for treating crude or refined cottonseed oils with "metallic-salt inactivators" at temperatures no greater than about 110° C. The treatment destroys the cyclopropenoid moiety which comprises about 6 parts malvalic acid and 1 part sterculic acid. The cottonseed oils resulting from the process of our invention are characterized by a complete absence of any Halphen response (i.e., are Halphen-negative) and, when included in the diet of laying hens, produce no abnormalities such as pink egg whites, salmon-colored, enlarged, and fluid yolks.

As contemplated in the present invention, the term Halphen-negative cottonseed oil relates to a cottonseed oil which does not develop a red color, having an absorptivity at 4.95 millimicrons when a mixture of the oil, n-butyl alcohol, and a 1% solution of roll sulphur in carbon disulfide are heated for about 2.5 hours at a temperature of 110° C. This will be discussed more fully below. The term "metallic-salt inactivator" relates to certain metal halides such as anhydrous or slightly hydrated aluminum chloride, stannic chloride, ferric chloride, zinc chloride, and aluminum bromide. These "inactivators" destroy the cyclopropenoid group thereby eliminating the factor which produces the red Halphen color response.

The term "roll sulfur" relates to a commercially-available form of rhombic crystalline sulfur which is highly soluble in carbon disulfide.

Background of the invention prior art

In U.S. Patent 3,087,946, Walter A. Pons, Jr., James C. Kuck, and Vernon L. Frampton described and claimed a process for treating refined cottonseed oil to effect bleaching thereof and to remove entirely the Halphen test response therefrom, which comprised heating a mixture containing sulfurous acid saturated activated alumina ($Al_2O_3$) and refined cottonseed oil in the proportion of about from 1 to 6 parts, by weight, of the alumina per 100 parts, by weight, of the cottonseed oil at a temperature of at least 225° C. for from 30 to 60 minutes, and separating the resulting bleached oil from the alumina. This process has several disadvantages. First, the treatment at such a high temperature of at least 225° C. may cause dimerization of the unsaturated fatty acid moieties in the cottonseed oil thereby reducing the edible qualities of the treated oil. Second, the presence of the sulfurous acid may introduce sulfur-containing components into the oil which are potential catalytic poisons in subsequent hydrogenation reactions as, e.g., in the manufacture of margarine and the like. Third, best results are obtained when the process is carried out in a vacuum or under an inert atmosphere which adds to the expense of the equipment required for the operation.

In U.S. Patent 3,135,775 Eric T. Rayner, Dorothy C. Heinzelman, and Harold P. Dupuy described and claimed a process for eliminating Halphen test response in cottonseed oil by (a) treating the cottonseed oil in an inert atmosphere at a temperature of about from 180° to 225° C. with a reagent selected from the group consisting of mellitic and trimellitic acid anhydrides, pyromellitic dianhydride, and orthophosphoric acid, (b) eluting the reagent treated and heated oil of step (a) through a column of alumina ($Al_2O_3$) and removing the solvent from the reagent treated and eluted oil from step (b).

This process likewise has several disadvantages. First, large quantities of expensive activated alumina ($Al_2O_3$) are required to remove the acids used in the process; second, high operating temperatures ranging from 180° to 225° C. for 30 to 120 minutes are required. These high temperature operating conditions require an inert atmosphere with accompanying expensive commercial equipment, or the risk of the possible oxidation of the unsaturated fatty acid moieties in the cottonseed oil with accompanying rancidity. Thus it is seen that there is a real need for a low-temperature, effective method in the cottonseed oil industry for destroying the cyclopropenoid moiety comprising malvalic and sterculic acids to produce Halphen-negative cottonseed oils, unattended by the above described disadvantages.

We have now found that by heating the cottonseed oil in the presence of a metallic-salt inactivator with stirring at a relatively low temperature, it is possible to destroy the cyclopropenoid moiety and produce a Halphen-negative cottonseed oil in a remarkably efficient and simple manner.

Summary of the invention

In general terms, the process of our invention may be described as follows:

(a) Treat the cottonseed oil, with stirring, at a temperature no greater than about 110° C. with a least one substantially anhydrous metallic-salt inactivator selected from the group consisting of anhydrous aluminum chloride, ferric chloride, stannic chloride, and aluminum bromide for about 1.75 to 2.25 hours. The ratio of the metallic-salt inactivator to the oil is about from 0.45 to 2.0 parts per 100 parts cottonseed oil. Parts are by weight.

(b) The metallic-salt inactivator is then removed from the cottonseed oil. The preferred procedure is to wash the oil with a dilute solution of at least one acid selected from the group consisting of hydrochloric acid, sulfuric acid, phosphoric acid, and acetic acid.

(c) The water layer containing the acid is then separated from the washed oil by drawing off the water layer.

(d) The washing and drawing-off steps (b) and (c) are repeated until the cottonseed oil is free of the metallic-salt inactivator.

(e) The oil of step (d) is then washed with water to remove any residual dilute acid.

(f) The oil is then separated from the wash water by drawing off the water layer.

(g) The cottonseed oil free of Halphen test response is then recovered.

It is also within the scope of our invention to remove the metallic-salt inactivator by washing with water instead of a dilute mineral acid in step (b) above. When a water wash is used the inactivator is precipitated as the hydroxide of the metallic-salt inactivator and is drawn off in the aqueous phase. The oil phase is then filtered to remove any suspended metallic hydroxide. Usually one water wash is sufficient to remove the precipitated inactivator. However, if spot tests for the particular metallic-salt inactivator used indicates the presence of residual inactivator in the washed oil, the washing, drawing-off and filtration steps can be repeated. The resultant cottonseed oil free of Halphen test response is then recovered. The use of water causes satisfactory Halphen-negative results to be obtained. However, we prefer to remove the inactivator from the oil by washing with a dilute acid solution as indicated in step (b) above. We also prefer to use anhydrous or slightly-hydrated aluminum chloride—i.e., anhydrous aluminum chloride plus water (see Example 9)—as the inactivator although the use of stannic chloride, ferric chloride, zinc chloride, and aluminum bromide is a good practice.

Generally, two types of cottonseed oils are treated by our novel process, namely, crude cottonseed oil and refined cottonseed oil. The process can, however, be applied to the crude oil at various stages of processing. It is also within the scope of our invention to apply the process to a hexane solution or other solvent solutions of the oil before or after refining or at some stage of the processing of the oil as convenient.

We prefer to use oil refined by commercially available processes known to those skilled in the art, but we are not limiting the process of our invention to refined cottonseed oils.

The amount of the metallic-salt inactivator required to eliminate the Halphen response (i.e., give Halphen-negative oil) is dependent on the initial Halphen response of the oil. As might be expected, crude cottonseed oil requires more of the inactivator than refined oils. The amount of inactivator employed should be at least equal to, preferably slightly in excess of the amount equivalent (mole per mole) to the cyclopropenoid moiety content of the oil. This amount is readily estimated from the initial Halphen response of the oil. It may also be ascertained for any given oil by trial determinations of the relative effectiveness of various proportions of the metallic-salt inactivator on small samples of the oil. The majority of commercially refined cottonseed oils require at leastt about 0.45 weight percent inactivator per 100 parts oil. Crude cottonseed oils require larger amounts of the metallic-salt inactivator, of the order of about 2.0 weight percent. While we are not limiting the invention to a particular theory, the increase in required amounts of the inactivator may be due to the presence in the crude cottonseed oils of large amount of constituents which would poison the inactivator.

The process of our invention presents several advantages over other methods of reducing or eliminating the Halphen response of cotton seed oils. Frst, there is no decrease in the unsaturation of the oil; second, it may be carried out at low temperatures no greater than about 110° C., thereby avoiding any degradation of the oil due to excessive heat; third, the process may be carried out using commercially-available chemicals in commercially-available equipment; fourth, the process is applicable to crude oil, refined oil, or at any convenient step in the processing of cottonseed oils useful in the preparation of rations for laying hens.

PROCEDURE FOR DETERMINING MODIFIED HALPHEN TEST

This method, as outlined, is to determine the Halphen color resopnse of cottonseed oils in which the total Halphen acid concentration does not exceed 10%.

*Special Apparatus*

The reaction flasks are specially fabricated low-actinic glass flasks constructed by extending the neck of 50 ml. Erlenmeyer flasks with 25 mm. tubing terminating with a 24/40 standard-tapered joint at the top to give an overall length of approximately 8 in. Vented caps were constructed for the flasks by sealing (fusing) a 1 in. length of 1 mm. capillary tubing to the hollow glass cap. The bath used is an opaque glass jar containing about 10 liters of oil maintained at 110±0.5° C. in a fume hood.

*Reagents*

(1) n-Butyl alcohol, freshly distilled in a nitrogen atmosphere
(2) Technical grade roll sulfur
(3) C.P. grade carbon disulfide (1% solution of sulfur in carbon disulfide)

*Procedure*

In subdued light, weight in quadruplicate accurately approximately a 0.5 g. sample (oil, acids, or esters) into the reaction flasks. Aliquot solutions may also be used. Add 25 ml. of n-butyl alcohol and 5 ml. of a 1% solution of roll sulfur in carbon disulfide. Insert the stoppers and immerse the flasks to a depth of 5 inches in an oil bath maintained at 110±0.5° C., preferably in a hood. Heat at this temperature for 2.5 hours and then remove the stopper and continue heating for 30 more minutes.

Remove the sample from the oil bath and quickly cool to room temperature under a stream of tap water. Transfer the sample quantitatively to a low-actinic 50 ml. volumetric flask and bring it to volume with additional n-butyl alcohol. The Halphen-test response is expressed in terms of the color intensity of the final solution at 50 ml. dilution; that is, in terms of its absorbance as measured in a 1-cm. cell with a Cary Model 14M spectrophotometer at the absorption maximum in the 490–500 mμ region. For the best results, the final dilution should be such as to give an optical density of less than 1.0. If the intensity of the solution is greater than an optical density of 1.00, the solution should be diluted with n-butyl alcohol to bring the optical density down below 1.00. The observed optical density value should then be corrected to correspond to that of a 0.5 g. sample using a 50 ml. dilution and measured in a 1-cm. cell.

Halphen color absorbance =

$$\frac{(\text{optical density})(50)}{\text{cell thickness (cm.) dilution (ml.)}}$$

This method of correction and evelution is known to analytical chemists skilled in the art of optical density measuements.

EXAMPLES

The following examples will serve to illustrate the practical aspects of our invention.

The cottonseed oil and the desired amount of metallic-salt deactivator are charged into a container, preferably a glass or stainless-steel round-bottomed container which is equipped with a two-hole stopper. Through one of the holes is inserted the shaft of a stirrer and through the other a means for measuring the temperature of the charge. The oil is then treated by heating the charge slowly with medium-to-vigorous stirring until the temperature of the charge reaches about 100° C., at which temperature stirring is continued for about two hours. Heating of the charge may be carried out in an oil bath or with an electric heating mantle (laboratory) or by pressurized steam for commercial work.

At the end of the heat treatment, the various steps described above on pages 5 and 6 are carried out followed by the analytical procedure to show the Halphen-negative cottonseed oil.

Three types of oil were evaluated, namely, Wesson Salad Oil (PC–4024), Rancher's Salad Oil (PC–4018), and American de Lux Salad Oil (PC–3964), all of which are commercially-available refined oils. The results follow:

TABLE I.—REFINED COTTONSEED OILS

| Ex. | Oil | Sample wt. (g.) | AlCl₃ wt. (g.) | Temp. (° C.) | Reaction Time (hrs.) | Initial Halphen Response | Final Halphen Response |
|---|---|---|---|---|---|---|---|
| 1 | Wesson (PC–4024) | 200 | None | 150 | 2 | 0.78 | 0.49 |
| 2 | do | 200 | 2.80 | 100 | 2 | 0.78 | 0.00 |
| 3 | Rancher's (PC–4018) | 100 | 1.41 | 100 | 2 | 0.83 | 0.00 |
| 4 | do | 100 | 0.47 | 100 | 2 | 0.83 | 0.00 |
| 5 | do | 100 | 0.94 | 100 | 2 | 0.83 | 0.00 |
| 6 | Amer. de Lux (PC–3964) | 100 | 0.47 | 100 | 2 | 0.50 | 0.00 |
| 7 | do | 100 | 0.71 | 100 | 2 | 0.50 | 0.00 |
| 8 | do | 100 | 0.47 | 100 | 2 | 0.50 | 0.00 |
| 9 | do | 100 | *0.47 | 100 | 2 | 0.50 | 0.00 |

*Plus 0.013 g. HOH.

It will be observed in Examples 8 and 9 that a ratio of inactivator to oil of 0.47 weight percent gave a Halphen response of 0.00; in other words, the oil is Halphen negative.

The following examples show the effect of increasing the weight ratio of inactivator to a cottonseed oil. A refined oil was used.

TABLE II

| Ex. | Oil | Sample wt. (g.) | AlCl₃ wt. (g.) | Temp. (° C.) | Reaction Time (hrs.) | Initial Halphen Response | Final Halphen Response |
|---|---|---|---|---|---|---|---|
| 10 | Wesson (PC–4024) | 100 | 0.20 | 100 | 2 | 0.78 | 0.38 |
| 11 | (PC–4024) | 100 | 0.35 | 100 | 2 | 0.78 | 0.03 |
| 12 | (PC–4024) | 100 | 0.70 | 100 | 2 | 0.78 | 0.01 |

It will be observed that increasing the weight ratio of inactivator-to-oil reduces the Halphen response.

When the procedures are repeated using amounts of ferric chloride, stannic chloride, or aluminum bromide equivalent to the amount of the aluminum chloride shown in Table I, generally similar results are obtained.

We claim:
1. A low temperature process for eliminating Halphen test response in cottonseed oil comprising the steps:
   (a) treating, by heating with stirring, at a temperature no greater than about 110° C., cottonseed oil with at least one substantially anhydrous metallic-salt inactivator selected from the group consisting of aluminum chloride, ferric chloride, stannic chloride, and aluminum bromide, for about 1.75 to 2.25 hours, the ratio of said metallic-salt inactivator to said oil being about from 0.45 to 2.0 parts per 100 parts oil, and said parts being by weight;
   (b) removing the metallic-salt inactivator by washing with an aqueous solution of at least one dilute acid selected from the group consisting of hydrochloric acid, sulfuric acid, phosphoric acid, and acetic acid;
   (c) separating the washed oil of step (b) from the aqueous solution of acid by drawing off water layer;
   (d) repeating the washing and drawing steps (b) and (c) until the cottonseed oil is free of the metallic-salt inactivator;
   (e) washing the oil of step (d) with an aqueous solution to remove the dilute acid;
   (f) separating the oil from the wash water by drawing off the water layer; and
   (g) recovering the cottonseed oil free of Halphen test response.

2. A low temperature process for eliminating Halphen test response in cottonseed oil comprising the steps:
   (a) treating, by heating with stirring at a temperature no greater than about 110° C., cottonseed oil with at least one substantially anhydrous metallic-salt inactivator selected from the group consisting of aluminum chloride, ferric chloride, stannic chloride, and aluminum bromide for about 1.75 to 2.25 hours, the ratio of said metallic-salt inactivator to said oil ranging about from 0.45 to 2.0 parts per 100 parts oil, parts being by weight;
   (b) precipitating the metallic-salt inactivator as a metallic hydroxide by washing with water;
   (c) drawing-off the aqueous phase;
   (d) rewashing the cottonseed oil with water and again drawing off the aqueous phase;
   (e) again filtering the oil phase to remove any residual suspended metallic hydroxide; and
   (f) recovering the cottonseed oil free of Halphen test response.

References Cited

UNITED STATES PATENTS 3,326,947   6/1967   Rayner et al. _____ 260—424

ALEX MAZEL, *Primary Examiner.*

A. M. TIGHE, *Assistant Examiner.*